Feb. 12, 1963 W. G. CAMACK ET AL 3,077,443
METHOD OF OPERATING AN EVAPORATIVELY COOLED NUCLEAR REACTOR
Filed June 3, 1958 2 Sheets-Sheet 2
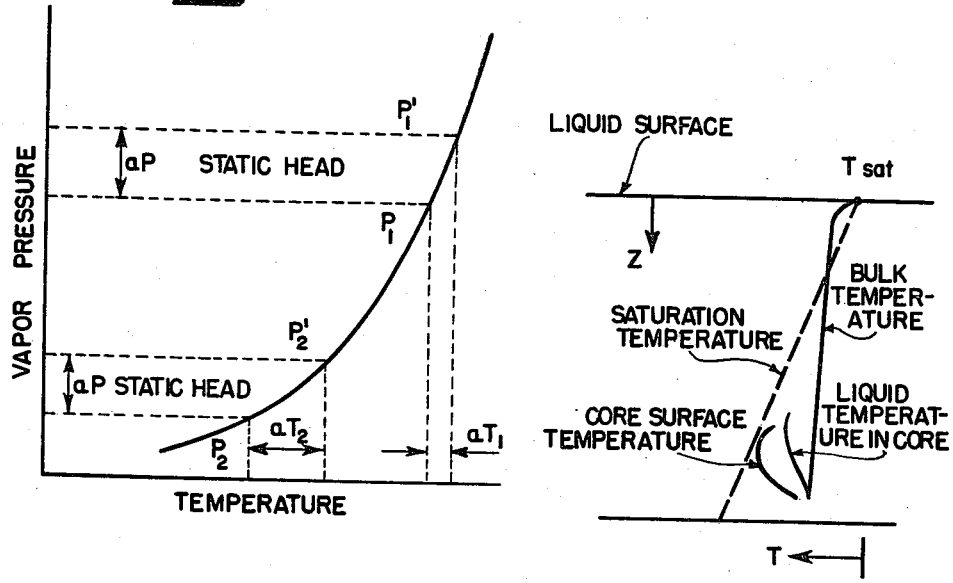
Fig. 2
Fig. 3
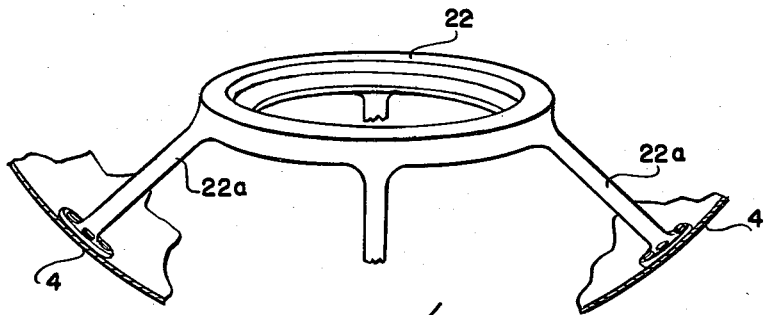
Fig. 4
INVENTORS
WALTER G. CAMACK
GEORGE LEPPERT
By
*George C. Sullivan*
Agent

3,077,443
METHOD OF OPERATING AN EVAPORATIVELY COOLED NUCLEAR REACTOR

Walter Gene Camack, Mountain View, and George Leppert, Stanford, Calif., assignors to Lockheed Aircraft Corporation, Burbank, Calif.
Filed June 3, 1958, Ser. No. 739,619
2 Claims. (Cl. 204—154.2)

This invention concerns a nuclear reactor system and method of operation of the same, and more particularly a reactor system whereby useful quantities of vapor motive fluid are generated from a reactor coolant without ebullition at the reactor core heat source.

Heretofore, nuclear reactor systems utilizing coolant vapor directly as the motive fluid have comprised those of the boiling type wherein a reactor is located in a water coolant pool, with operation of the reactor core producing boiling of the water at the core heated surfaces. To overcome reactor stability problems, either the water coolant pool must be pressurized or there is necessitated a secondary heat exchanger in the system. Although there is the possibility that the desirable feature of employing the coolant vapor directly in the turbine can be had with a boiling reactor also, such desirability is lessened by the inherent variations encountered during boiling thereby allowing stability problems to arise in both thermal and fast reactors. In a thermal reactor, if the coolant acts as the moderator, as is the case in a boiling water reactor, vapor formation in the core effects moderator density variations which, in turn, vary the reactivity. Similarly, in a fast reactor, vapor formation leads to a variable reactivity because of the resulting fluctuations in poison density.

Notwithstanding the accomplishment of stability in boiling water reactors, the efficient operation is somewhat limited as water is a very poor evaporator and the rate of vapor formation is very much restricted in that the vapor-liquid ratio must be kept low. No such restriction is placed on the non-boiling evaporative coolant cycle. Furthermore, because the core would contain liquid only, the core volume is considerably smaller than that for a boiling reactor. In short, a non-boiling, evaporatively cooled reactor system would be free of many of the difficulties encountered in boiling systems.

Accordingly, it is an object of this invention to provide a method of operating a nuclear reactor system using coolant vapor directly as the motive fluid without having to provide a secondary heat exchanger.

It is another object of this invention to provide a nuclear reactor system operational method in which coolant vapor is used directly as the motive fluid without necessitating or requiring pressurization of the system.

A further object of this invention is to provide a nuclear reactor system in which useful quantities of reactor coolant vapor are generated without ebullition in the reactor core.

A still further object of this invention is to provide a non-boiling nuclear reactor system having high rates of evaporation of the reactor coolant at the free surface thereof.

It is a still further object of this invention to provide a non-boiling nuclear reactor system having high rates of evaporation of the reactor coolant at the free surface thereof without heating the heated core surfaces above the saturation temperature for the pressure at that point in the reactor core.

It is still another object of this invention to provide a nuclear reactor system using coolant vapor directly as the motive fluid without having to pressurize the system and without having the inherent operation variations due to variable reactivity caused by density changes in the reactor coolant by ebullition in the core.

A still further object of the invention is to provide a nuclear reactor system requiring a smaller core volume than that necessary for a boiling type reactor system.

Further objects and advantages of this invention will become apparant from the following description taken in connection with the accompanying drawings in which:

FIGURE 2 is a typical vapor-pressure curve of a liquid;

FIGURE 3 is a curve showing the relationship of the coolant liquid temperature to the saturation temperature through the depth of the coolant fluid in the reactor depicted in FIGURE 1;

FIGURE 4 shows a modification of the reactor of FIGURE 1 for allowing natural circulation of the liquid coolant.

Figure 1:
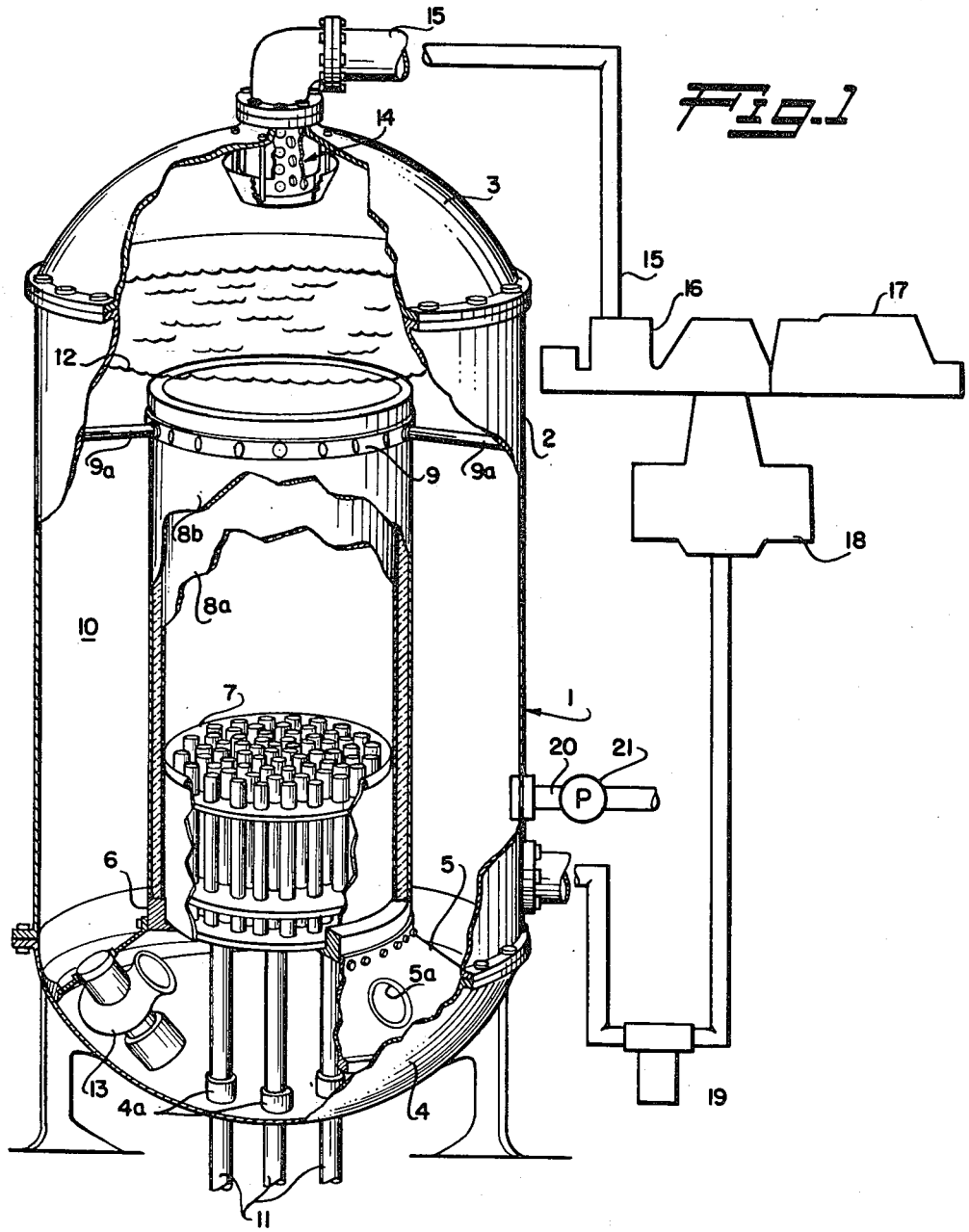
FIGURE 1 shows details of a reactor vessel in one embodiment of this invention, with the reactor in a closed system, turbine driven power cycle, the power cycle portion other than the reactor vessel being shown schematically.

Generally stated, the invention provides a non-boiling evaporative system employed in a reactor power cycle by submerging the fuel elements in a pool of coolant of sufficient depth that an appreciable increase of saturation temperature occurs from the evaporating surface to the vicinity of the fuel elements, with the desired heat transfer rate attained without bringing the temperature of any point on the heated surfaces in the core above the saturation temperature for the pressure at that point in the core. The resulting temperature difference between the heated surface and the saturated water at the pool top (the overall $dT$) would be the saturation temperature difference corresponding to the pressure change due to a static head, and would be a function of the pressure of the vapor evolved as well as being a function of the heat flux, since $(dT/dP)_{sat}$ (which represents the change of saturation temperature with a change in pressure, ° F./p.s.i.a) varies with pressure. Temperature measurements indicate that the bulk liquid temperature (away from the heated and free surfaces) is nearly constant with the pool depth. Because of this nearly constant bulk temperature, which is below saturation temperature at the pool bottom and above saturation temperature at the top, there is consequently a relatively large temperature difference established between the bulk of the liquid and the heated and free surfaces. Hence, the bulk liquid temperature, which was below the saturation temperature at the core because of the pressure generated by the static fluid head, and is above the saturation temperature at the free surface of the liquid, results in rapid liquid evaporation into substantial quantities of coolant vapor at the liquid free surface. Thus the heat generated by the reactiveness of the reactor core is carried away by the loss of heat from the coolant liquid due to the latent heat of vaporization loss caused by the evaporation of the coolant, the resultant coolant vapor being utilized directly as the primary motive fluid.

When a liquid is heated to saturation at the bottom of the pool having a free surface, there is a heat transfer convection flow from the fluid flowing through the heater towards the free surface by a normal circulation of the liquid, and because of the change in saturation temperature with static head pressure, the fluid becomes superheated as it rises toward the free surface, resulting in rapid evaporation. This difference in saturation temperature in any pool of liquid between the bottom and the top of the pool occurs because of the static head of the fluid. Depending on the pressure on the system, the difference may be large or small, as can be seen in FIGURE 2 which is a typical vapor pressure curve. For a system being operated at pressure $P_1$, with a pool depth such that the pressure differential is $dP$, the effected $dT_1$ is small. However, if the same pool is at pressure P₂, the resulting $dT_2$ is considerably larger. From this it follows that with high density liquids at low pressures, large differences in saturation temperature can be had with relatively small depth.

Referring to FIGURE 1, the reactor comprises an outer tank or vessel 1 consisting of a center tubular section 2 having an upper dome end 3 and a lower dome end 4. Disposed within the lower dome end 4 is a frustro-conical baffle 5 which has its larger diameter end secured to the inner surface of lower dome end 4 by any appropriate means such as welding, riveting, etc. To the inner surface of the smaller diameter end of baffle 5 is bolted an annular L-shaped cross-sectional ring 6, which serves as a seat for a removable nuclear fuel core assembly 7.

Surrounding the outside of core 7, and also seating an annular ring 6, is a double shelled cylindrical chimney 8 formed by cylindrical members 8a and 8b. The chimney is maintained in an upright position by a supporting band 9 secured around the outer surface of outer cylindrical chimney member 8b, the supporting band 9 maintained spaced from the inner surface of center tubular section 2 by a plurality of arms 9a to form an annular downcomer passage 10 between tubular section 2 and chimney member 9.

Reactivity control of nuclear fuel core 7 is accomplished by a plurality of control rods 11 extending downwardly from core 7 and through sealed openings or passages 4a in lower dome end 4. Control rods 11 are moved or adjusted by any appropriate control rod drive mechanism (not shown).

When the reactor is supplied with a liquid coolant, the level or free surface of which is above the top of the cylindrical chimney as indicated by 12, a forced convection of heat from the core 7 to the liquid and ultimately to the free surface 12 is accomplished by a plurality of circulating pumps 13 mounted in openings 5a through baffle 5. Thus, as the pumps 13 are operated, a forced circulation of coolant fluid is established downwardly in the annular downcomer 10, through the pumps and upwardly through the core 7 and cylindrical chimney member 8 toward the free surface 12 of the pool.

The coolant vapor that is formed above the coolant free surface 12 is conducted from the upper dome end 3 through a baffle type vapor-liquid separator 14 to a conduit 15 for conducting the coolant vapor as the motive fluid to a turbine 16 as shown schematically in FIGURE 1, for driving a generator 17 or other power absorbing means. After passing through the turbine 16, the coolant vapor is condensed by a condenser 18 and pumped back into the reactor tank or vessel 1 by a pump 19.

In order to control or vary the static head of the coolant at the core 7, which in turn controls the coolant evaporation rate at the free surface 12, a coolant level control is accomplished by a conduit 20 and two-way pump 21 communicating between the coolant liquid within the reactor 1 and a coolant liquid supply or source (not shown). Thus, as the rate of evaporation is desired to be changed without changing the reactivity of the core, coolant liquid may be added or withdrawn from the reactor vessel 1 by operation of pump 21.

Should the type of coolant be used for which forced circulation is not necessary, the modification as shown in FIGURE 4 may be used to replace the baffle 5 and circulating pumps 13 of FIGURE 1. In this embodiment, an L-shaped cross-sectional ring 22, which is similar to ring 6, has a plurality of support legs 22a integral therewith for securing the ring to the lower dome end 4. The core 7 and cylindrical chimney members 8a and 8b seat on ring 22 the same as on ring 6 as described above, thus forming a natural circulation path for the liquid coolant in reactor vessel 1. This natural circulation path is downwardly through the annular downcomer 10, through the openings between adjacent support legs 22a and upward through core 7 and the chimney to the coolant free surface 12.

The curve in FIGURE 3 shows the relative relationships between the coolant temperature and the saturation temperature plotted against the liquid coolant depth below the free surface. As can be seen, and as explained above, the saturation temperature is directly proportional with the static head caused by the liquid depth in that the greater the liquid depth, the higher the saturation temperature. Also, as can be seen, the bulk liquid temperature is substantially constant throughout the depth except for a $dT$ at the free surface and in the core. While the major portion of the overall $dT$ is at the heated surface, as compared to the $dT$ at the free surface, the overall $dT$ can be made to reach any practical value by varying the pressure on the pool and the pool depth, and so, in this case, the rate of heat transfer and evaporation is limited only by the allowable liquid column height. Thus, the non-boiling evaporatively cooled cycle is accomplished by maintaining the liquid at a level such that the saturation temperature is never exceeded at any point along the length of the fuel core element surface or surfaces when the desired heat transfer rate is established. In other words, the fuel core wall temperature at each point must be equal to or less than $[(dT/dP)_{sat}\rho Z + T_{sat}]$; where $(dT/dP)_{sat}$ = the change in saturation temperature with pressure at the pressure above the pool, °F./p.s.i.a.; $\rho$ = the liquid density; $Z$ = the depth below the free surface; and $T_{sat}$ = the saturation temperature at the pool top. By controlling the overall $dT$, control of the evaporation rate is effected, which in turn controls the heat flux, or power of the motive fluid.

Although the principle involved is readily applicable for any liquid for use as a coolant, a preferable choice of a liquid for coolant should have a large rate of change of saturation temperature with liquid depth to avoid excessively high liquid columns as determined by the quantity $\rho(dT/dP)_{sat}$. Also, the desired $\rho(dT/dP)_{sat}$ must be had in a reasonable temperature range in that in the upper limit, the temperature cannot be more than, say, 1000° F. or the maximum allowable fuel element temperature, nor can the temperature be so high as to yield excessive vapor pressures. On the other hand, in the lower limit, the pressure at a reasonably low condenser temperature should not be too low, nor should the required sink temperature be below what is commonly available. Further, the liquid should be stable under the conditions to which it will be subjected, e.g. it can not decompose as a liquid nor can it disproportionate during evaporation. In order to stay within the above specified range of temperatures and pressures, the preferable liquids in addition to water are those with vapor pressures lower than water but higher than 1 atmosphere at 1000° F. The most preferable liquids for coolants other than water, and without adding excessive complexity to the reactor system, are mercury (Hg), bismuth tribromide ($BiBr_3$), and diphenyl ($C_6H_5C_6H_5$).

Of the various requirements imposed upon the coolant, that of a necessarily high $\rho(dT/dP)_{sat}$ is probably the most limiting. While the $\rho(dT/dP)_{sat}$ of both mercury and bismuth tribromide are satisfactory at 1000° F., diphenyl must be used at around 450° F. to yield a reasonable $\rho(dT/dP)_{sat}$. Nevertheless, this criterion alone does not eliminate diphenyl, since its good moderating value at low cost renders it very desirable for a thermal reactor coolant. Mercury, on the other hand, could be used only in a fast reactor, but bismuth tribromide could probably be used regardless of the neutron energies since it has neither a high absorption cross section nor a high scattering cross section. On the other hand, water is probably the least preferable of the liquids as a coolant in a reactor of this type because of the extensive pool depths required, and the latent heat of the other three liquids are substantially lower than that for water (which is 970.3 B.t.u./lb. at 1 atmosphere).

Once the heat flux and coefficient of heat transfer is established, variations in the operating pressures of the coolant vapor can be accomplished by the variations in the pool depth. For example, assuming a pool heat flux of $5 \times 10^4$ B.t.u./hr. ft.$^2$, at a coefficient of heat transfer of 1000 B.t.u./hr. ft.$^2$ °F., we have an overall $dT$ due to the static head of 50° F. Thus, for mercury at 1000° F., and 180 p.s.i.a. (vapor evolved), the $dP$ corresponding to a $dT$ of 50° F. is 70 p.s.i.a., as the saturation pressure at 1050° F. is 250 p.s.i.a. Thus the depth of mercury necessary to effect a pressure difference of 70 p.s.i.a. is:

$$Z=\frac{dP}{\rho}=\frac{70 \text{ lb.}}{\text{in.}^2}\times\frac{144}{\text{ft.}^2}\times\frac{\text{ft.}^3}{790 \text{ lb.}}=12.75 \text{ ft.}$$

A considerable reduction of pool depth and temperature is realized for operation at a lower pressure, for example, for mercury at 750° F., and a saturation pressure of 30 p.s.i.a. (vapor evolved), the $dP$ corresponding to a $dT$ of 50° F. is 15 p.s.i.a. as the saturation pressure at 800° F. is 45 p.s.i.a. The depth of mercury necessary to effect a pressure difference of 15 p.s.i.a. is:

$$Z=\frac{dP}{\rho}=\frac{15 \text{ lb.}}{\text{in.}^2}\times\frac{144 \text{ in.}^2}{\text{ft.}^2}\times\frac{\text{ft.}^3}{795 \text{ lb.}}=2.72 \text{ ft.}$$

Thus, it can be seen that by controlling the coolant liquid depth to effect the change of saturation temperature with static head between the heated core surface and the liquid free surface, the coolant liquid can be heated at the heated core surfaces to a temperature above that which is the saturation temperature at the liquid free surface without ebullition at the core, the heated liquid coolant rising toward the liquid free surface by natural or forced circulation and evaporating rapidly thereat because of the lower saturation temperature. The advantages of eliminating ebullition at the heated core surfaces are readily apparent in that it eliminates the density variations of the coolant caused by bubble formation that occurs during ebullition, and with such density variations eliminated, requires a smaller heating core for the same rate of heat transfer from the core to the liquid coolant. Also, by stabilizing the heat transfer in the core, a substantial heat flux is established by the evaporation of the coolant at the free surface permitting the coolant vapor generated to be used as the primary motive fluid rather than having to incorporate a secondary heat exchanger to overcome the instabilities of coolant vapor occasioned when ebullition occurs in the core.

While one particular embodiment of the invention has been illustrated and described, it will be obvious to those skilled in the art that various changes and modifications may be made without departing from the invention and it is intended to cover in the appended claims all such modifications and equivalents that fall within the true spirit and scope of this invention.

What is claimed is:

1. A method of continuously cooling a nuclear reactor core by a liquid coolant and utilizing thermal energy generated therefrom in an external turbine and condenser system, comprising placing the core in a free-surface pool of liquid having a vapor pressure between one atmosphere and that of water at 1000° Fahrenheit, circulating the liquid about said core to increase efficient heat transfer therefrom, maintaining the height of the liquid column above the core with respect to variations in core liquid temperature such that the total pressure exerted by the reactor vapor pressure and the liquid column is greater than saturation pressure at core liquid temperature and is continuously maintained upon the core liquid to prevent boiling therein while permitting vaporization from said free-surface pool, and varying the height of the liquid column above the core so that the operating pressure of the coolant vapor is varied indirectly with respect to the height of the liquid column so that the power derivable from the motive fluid by said external turbine and condenser system is varied.

2. A method of continuously cooling a nuclear reactor core by a liquid coolant and utilizing thermal energy generated therefrom in an external turbine and condenser system, comprising placing the core in a free-surface pool of liquid having a vapor pressure between one atmosphere and that of water at 1000° Fahrenheit, circulating the liquid about said core to increase efficient heat transfer therefrom, maintaining the height of the liquid column above the core with respect to variations in core liquid temperature such that the total pressure exerted by the reactor vapor pressure and the liquid column is greater than saturation pressure at core liquid temperature and is continuously maintained upon the core liquid to prevent boiling therein while permitting vaporization from said free-surface pool, and adding liquid to and withdrawing liquid from said pool to vary the liquid column height so that the operating pressure of the coolant vapor is varied indirectly with respect to the height of the liquid column so that the power derivable from the motive fluid by said external turbine and condenser system is varied.

References Cited in the file of this patent

UNITED STATES PATENTS

| | | |
|---|---|---|
| 2,796,396 | Szilard | June 18, 1957 |
| 2,815,319 | Snell | Dec. 3, 1957 |
| 2,825,688 | Vernon | Mar. 14, 1958 |
| 2,841,545 | Zinn | July 1, 1958 |
| 2,857,324 | De Boisblanc et al. | Oct. 21, 1958 |

FOREIGN PATENTS

| | | |
|---|---|---|
| 1,126,414 | France | July 30, 1956 |

OTHER REFERENCES

IDO–16064, Permissible MTR Power Levels and Without Film Boiling, Jan. 15, 1953, 24 pages.

Nucleonics, vol. 13, No. 7, July 1955, pp. 34–35.

Atomic Energy Commission Document ANL–5607, The EBWR, May 1957, pages 34, 5, 87, 220, 221.

Nucleonics, vol. 13, No. 12, December 1955.